Patented May 31, 1938

2,118,897

UNITED STATES PATENT OFFICE 2,118,897

SPINNING SOLUTIONS AND THE PRODUCTION OF ELASTIC YARNS THEREFROM

Robert Pickles and John Pickles, Burnley, England

No Drawing. Application August 19, 1935, Serial No. 36,939. In Great Britain July 31, 1935

6 Claims. (Cl. 18—54)

The invention relates to the production of elastic yarns of the kind composed of a mixture of rubber latex and viscose. In such mixtures as have heretofore been proposed for the preparation of a spinning solution in the manufacture of elastic yarns the proportion of the viscose content has generally been of the order of 10% of the whole, whilst attempts made to increase such proportion have been foiled by the presence of certain substances combined with the crude viscose which interfered with the extrusion of the solution owing to their propensity for thickening the rubber content of the latex.

The object of the invention is to provide an improved mixture of ingredients for a spinning solution of the kind referred to, wherein the proportion of the viscose content may be increased up to as much as 50% of the whole, or alternatively whereby viscose may be impregnated with a similarly proportioned admixture of latex.

The invention consists in purifying the viscose by transformation prior to its incorporation with the latex content in such manner as to eliminate from, or render innocuous in the former, any entrained substances as for instance caustic soda and carbon bisulphide which may cause thickening of the latter.

According to one method of carrying the invention into effect, the crude viscose is filtered and brought to the condition in which it is commonly referred to as a "spinning solution". A quantity of saturated brine solution or alcohol is added to the viscose in sufficient amount to effect the eventual formation or precipitation of a jelly, which latter, being a pure hydrated cellulose, is then separated from the liquor and dissolved in water. This treatment may be repeated any number of times until the purification of the cellulose hydrate has attained the required degree.

After such purification, unconcentrated rubber latex, being already mixed with suitable vulcanizing and accelerating agents, e. g. sulphur, zinc oxide, sodium diethyl dithiocarbamate, and sodium iso-propyl xanthate, amounting in all to 5% of the total weight of latex, may then be admixed with the cellulose hydrate and a thoroughly homogeneous mixture obtained by stirring. In the case of a solution produced from a mixture in equal proportions containing 45% of natural latex, thread may be spun by the means customarily employed in the spinning of artificial silk, the coagulating bath containing any organic acid or metallic salts and a heated godet wheel being employed on the spinning machine. The remaining operations of washing, drying and reeling may afterwards be performed in the customary manner. The resultant thread will contain approximately 15% of cellulose and 85% of vulcanized rubber and, after vulcanization, will possess a strong affinity for cotton dyestuffs.

What we claim as our invention and desire to secure by Letters Patent is:—

1. A spinning solution for the manufacture of elastic yarns, comprising a mixture of rubber latex and pure cellulose hydrate.

2. The method of manufacturing elastic filaments which comprises precipitating cellulose hydrate in jelly form from crude viscose solution, separating the jelly and the liquor, dissolving the jelly in water and again precipitating it, repeating these steps until the product has become pure cellulose hydrate, dissolving this in water, mixing this solution with rubber latex, and spinning a filament of this mixture into a coagulating solution.

3. The method of preparing elastic filaments which comprises preparing an aqueous solution of pure cellulose hydrate and mixing this solution with rubber latex containing an amount of rubber latex equal to that of the cellulose hydrate and spinning a filament of this mixture into a coagulating solution.

4. The method of manufacturing elastic filaments which comprises preparation of an aqueous solution of pure cellulose hydrate, mixing it with rubber latex containing vulcanizing and accelerating agents amounting to 5% of the total weight of latex, thoroughly commingling the mixture and spinning a filament thereof into a coagulating bath.

5. The method of manufacturing elastic filaments, which comprises precipitating cellulose xanthate in jelly form from crude viscose solution by an alcoholic solution, removing the liquor, dissolving the jelly in water and again precipitating it by an alcoholic solution, repeating these steps until the product has become pure cellulose hydrate, dissolving this in water, mixing this solution with rubber latex, and spinning a filament of this mixture into a coagulating solution.

6. The method of manufacturing elastic filaments, which comprises precipitating cellulose xanthate in jelly form from crude viscose solution by a salt solution, removing the liquor, dissolving the jelly in water and again precipitating it by the salt solution, repeating these steps until the product has become pure cellulose hydrate, dissolving this in water, mixing this solution with rubber latex, and spinning a filament of this mixture into a coagulating solution.

ROBERT PICKLES.
JOHN PICKLES.